(12) United States Patent
Kurth

(10) Patent No.: US 10,648,549 B2
(45) Date of Patent: May 12, 2020

(54) DRIVE DEVICE FOR A MOTOR VEHICLE

(71) Applicant: Schaeffler Technologies AG & Co. KG, Herzogenaurach (DE)

(72) Inventor: Franz Kurth, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/777,857

(22) PCT Filed: Nov. 23, 2016

(86) PCT No.: PCT/DE2016/200538
§ 371 (c)(1),
(2) Date: May 21, 2018

(87) PCT Pub. No.: WO2017/088873
PCT Pub. Date: Jun. 1, 2017

(65) Prior Publication Data
US 2018/0340601 A1 Nov. 29, 2018

(30) Foreign Application Priority Data
Nov. 24, 2015 (DE) .................. 10 2015 223 130

(51) Int. Cl.
*F16H 48/36* (2012.01)
*F16H 48/30* (2012.01)
*F16H 37/08* (2006.01)
*F16H 48/10* (2012.01)
*F16H 48/38* (2012.01)
*F16H 48/34* (2012.01)

(52) U.S. Cl.
CPC .......... *F16H 48/36* (2013.01); *F16H 37/082* (2013.01); *F16H 48/10* (2013.01); *F16H 48/30* (2013.01);
(Continued)

(58) Field of Classification Search
CPC ........ F16H 37/082; F16H 48/10; F16H 48/30; F16H 48/36; F16H 48/38; F16H 2048/343; F16H 2048/364; F16H 2048/382
(Continued)

(56) References Cited

U.S. PATENT DOCUMENTS 7,334,670 B2 * 2/2008 Namuduri .......... B60K 17/3462
192/21.5
7,708,665 B2 * 5/2010 Wheals .................. B60K 17/16
475/205
(Continued)

FOREIGN PATENT DOCUMENTS

DE 102007017185 A1 10/2008
DE 102008061945 A1 6/2010
(Continued)

*Primary Examiner* — Leslie A Nicholson, III
(74) *Attorney, Agent, or Firm* — Davidson, Davidson & Kappel, LLC

(57) ABSTRACT

A drive device for a motor vehicle, includes a differential gearing and a torque vectoring unit having an electric machine, wherein the differential gearing has a first and a second planet set, which are rotatably supported on a common planet carrier, wherein the first planet set meshes at least with a first sun, the second planet set meshes at least with a second sun, and the two planet sets at least mesh with each other in pairs, and wherein at least the second sun is connected to the torque vectoring unit in order to redistribute the torque between the first and the second suns.

18 Claims, 1 Drawing Sheet

(52) U.S. Cl.
CPC ....... *F16H 48/38* (2013.01); *F16H 2048/343* (2013.01); *F16H 2048/364* (2013.01); *F16H 2048/382* (2013.01)

(58) Field of Classification Search
USPC .......................................................... 475/150
See application file for complete search history.

(56) References Cited

U.S. PATENT DOCUMENTS

| | | | | |
|---|---|---|---|---|
| 8,430,779 | B2 * | 4/2013 | Hoehn | ................... F16H 48/10 475/225 |
| 8,506,439 | B2 * | 8/2013 | Strasser | ................ B60K 6/387 475/221 |
| 2010/0167862 | A1 | 7/2010 | Hoehn | |
| 2016/0129784 | A1 | 5/2016 | Wein | |
| 2018/0172124 | A1 * | 6/2018 | Valente | ................... F16H 3/663 |

FOREIGN PATENT DOCUMENTS

| | | | | |
|---|---|---|---|---|
| DE | 10 2009 059 903 A1 | 6/2011 | | |
| DE | 102009056366 A1 | 6/2011 | | |
| DE | 10 2010 036 239 A1 | 3/2012 | | |
| DE | 102010036241 A1 * | 3/2012 | ............. | F16H 48/36 |
| DE | 102010045876 A1 | 3/2012 | | |
| DE | 102009049856 B4 | 9/2012 | | |
| EP | 2272701 A2 | 1/2011 | | |
| WO | WO2013013841 A1 | 1/2013 | | |
| WO | WO2014191091 A1 | 12/2014 | | |

* cited by examiner

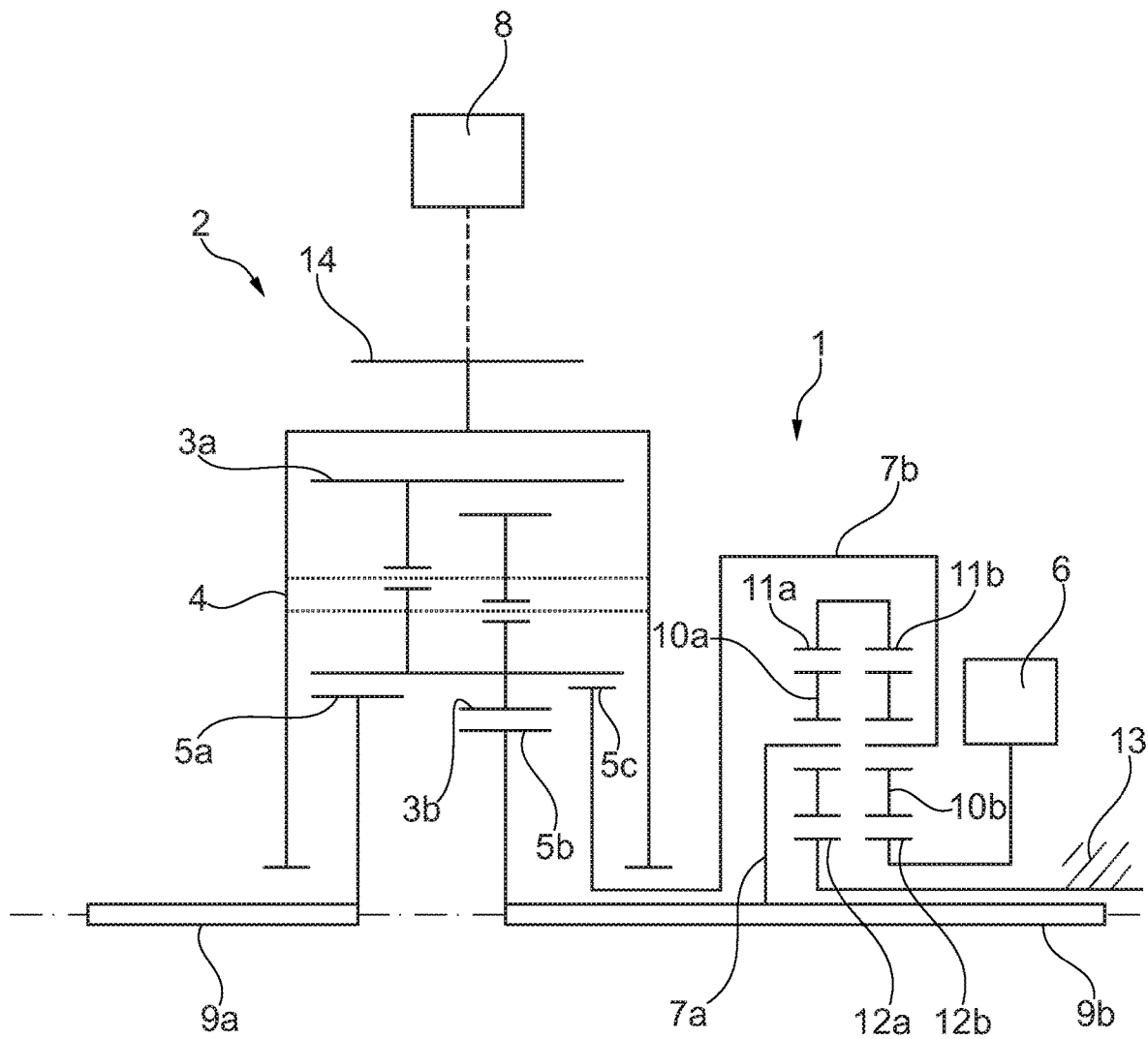

DRIVE DEVICE FOR A MOTOR VEHICLE

The disclosure relates to a drive device for a motor vehicle, comprising a differential gear and a torque vectoring unit having an electric machine.

BACKGROUND

DE 10 2009 059 903 A1 discloses a system for variable torque distribution within at least one axle of a motor vehicle. The system comprises a main drive and a torque vectoring motor. The main drive is arranged eccentrically in relation to the axle in such a way that the torque thereof can be introduced into a differential, which is arranged on the axle, via at least one up-stream gear stage.

DE 10 2010 036 239 A1 furthermore discloses a gear arrangement for a vehicle, having a transfer gear section for distributing a first drive torque of a first motor between a first and a second axle region of the vehicle. Furthermore, the gear arrangement has a coupling gear section, which is designed to transmit a second drive torque from a second motor to the transfer gear section via a first power flow path in a first operating state, allowing the second drive torque to be combined as an additional drive torque with the first drive torque. In a second operating state, the coupling gear section transmits the second drive torque to at least one of the axle regions via a second power flow path.

SUMMARY OF THE INVENTION

An object of the present disclosure is refining a drive device having a torque vectoring unit.

A drive device is provided for a motor vehicle that comprises a differential gear and a torque vectoring unit having an electric machine, wherein the differential gear has a first and a second planet set rotatably mounted on a common planet carrier, wherein the first planet set meshes at least with a first sun, the second planet set meshes at least with a second sun, and the two planet sets mesh with one another at least in pairs, and wherein at least the second sun is connected to the torque vectoring unit in order to redistribute the torque between the first and the second sun. In particular, the common planet carrier is connected at least indirectly to an electric drive motor. The common planet carrier is preferably designed as an epicyclic housing and has toothing for connection to the electric drive motor.

The electric machine brings about the redistribution of a torque fed into the differential between the two planet sets and thus also between the two suns. In this way, on the one hand, uniform driving of both suns is possible. On the other hand, it is also possible to introduce all the torque into a single sun.

The first sun is connected to a first output shaft and the second sun is connected to a second output shaft. The respective output shaft is preferably connected to a respective wheel of a driven axle of the vehicle. Redistributing the torque to one sun gives rise to a yawing moment around the vertical axis of the vehicle, thereby making it possible to selectively influence the driving dynamics. If, on the other hand, the torque vectoring unit distributes all the torque from one sun to the other sun, the yawing moment can be applied in the opposite direction. By controlling the torque at the torque vectoring unit, the yawing moment is thus adjusted in an infinitely variable manner.

As a particular preference, the first planet set also meshes with a third sun, wherein the third sun is connected to the torque vectoring unit in order to redistribute the torque between the first and the second sun. Consequently, each planet of the first planet set meshes, on the one hand, with the first sun and, on the other hand, with the third sun and furthermore also with a respective planet of the second planet set. For this purpose, the first planet set is of wider design than the second planet set. Furthermore, the third sun, which is designed as an intermediate wheel, increases the transmission ratio of the torque vectoring unit.

The second sun is preferably connected to a first planet carrier of the torque vectoring unit. Furthermore, the third sun is connected to a second planet carrier of the torque vectoring unit. In particular, the torque vectoring unit comprises a first and a second planet set, wherein the first planet set is rotatably mounted on the first planet carrier and meshes radially between a first annulus and a first sun, and wherein the second planet set is rotatably mounted on the second planet carrier and meshes radially between a second annulus and a second sun. As a further preference, the first sun is secured in a stationary manner on a housing, and the second sun is connected to the electric machine. In particular, the first and the second annulus are connected to one another for conjoint rotation.

BRIEF SUMMARY OF THE DRAWING

Further measures are explained in greater detail below together with the description of a preferred illustrative embodiment with reference to the single FIGURE. The single FIGURE shows a simplified schematic illustration intended to illustrate the construction of a drive device according to the disclosure.

DETAILED DESCRIPTION

According to the single FIGURE, a drive device according to the disclosure for a motor vehicle has a differential gear 2 and a torque vectoring unit 1 having an electric machine 6. The differential gear 2 comprises a first and a second planet set 3a, 3b and a common planet carrier 4, on which the two planet sets 3a, 3b are rotatably mounted. In particular, the common planet carrier 4 is designed as an epicyclic housing of the differential gear 2 and is driven by an electric drive motor 8, in particular via drive toothing 14 in order to introduce a torque into the differential gear 2. The torque introduced is distributed between the two planet sets 3a, 3b via the common planet carrier 4.

The first planet set 3a meshes both with a first sun 5a and with a third sun 5c. For this purpose, the first planet set 3a is of wider design than the second planet set 3b. In contrast, the second planet set 3b meshes with a second sun 5b. Furthermore, the two planet sets 3a, 3b mesh with one another in pairs. Consequently, the two planet sets 3a, 3b are designed as differential planet sets.

The first sun 5a is connected to a first output shaft 9a, and the second sun 5b is connected to a second output shaft 9b. Furthermore, the second sun 5b is connected to the torque vectoring unit 1 in order to redistribute the torque between the two planet sets 3a, 3b and thus also to redistribute the torque between the first and the second sun 5a, 5b. The third sun 5c is also connected to the torque vectoring unit 1 in order to redistribute the torque between the two planet sets 3a, 3b and thus also to redistribute the torque between the first and the second sun 5a, 5b. The three suns 5a, 5b, 5c together with the two planet sets 3a, 3b are arranged in the epicyclic housing of the differential gear 2 to form a particularly compact construction.

The torque vectoring unit 1 comprises a first and a second planet set 10a, 10b, wherein the first planet set 10a is rotatably mounted on a first planet carrier 7a and meshes radially between a first annulus 11a and a first sun 12a. The second planet set 10b is rotatably mounted on the second planet carrier 7b and meshes radially between a second annulus 11b and a second sun 12b. The two annuluses 11a, 11b are connected to one another for conjoint rotation. Furthermore, the first sun 12a is secured in a stationary manner on a housing 13, and the second sun 12b is connected to the electric machine 6. The first planet carrier 7a of the torque vectoring unit 1 is connected to the second sun 5b of the differential gear 2, wherein the second planet carrier 7b of the torque vectoring unit 1 is connected to the third sun 5c of the differential gear 2.

LIST OF REFERENCE SIGNS 1 torque vectoring unit
2 differential gear
3a, 3b planet set
4 common planet carrier
5a-5c sun
6 electric machine
7a, 7b planet carrier
8 electric drive motor
9a, 9b output shaft
10a, 10b planet set
11a, 11b annulus
12a, 12b sun
13 housing
14 drive toothing

What is claimed is:

1. A drive device for a motor vehicle comprising:
   a differential gear; and
   a torque vectoring unit having an electric machine, the differential gear having a first planet set and a second planet set, the first planet set and the second planet set being rotatably mounted on a common planet carrier, the first planet set meshing at least with a first sun, the second planet set meshing at least with a second sun, the first planet set and the second planet set meshing with one another at least in pairs, at least the second sun being connected to the torque vectoring unit to redistribute torque between the first sun and the second sun, the first planet set also meshing with a third sun, the third sun being connected to the torque vectoring unit to redistribute torque between the first sun and the second sun.

2. The drive device as claimed in claim 1 wherein the second sun is connected to a first planet carrier of the torque vectoring unit.

3. The drive device as claimed in claim 1 wherein the third sun is connected to a second planet carrier of the torque vectoring unit.

4. The drive device as claimed in claim 1 further comprising an electric drive motor, the common planet carrier being connected at least indirectly to the electric drive motor.

5. The drive device as claimed in claim 1 wherein the first sun is connected to a first output shaft, and the second sun is connected to a second output shaft.

6. The drive device as claimed in claim 1 wherein the torque vectoring unit comprises a first planet set and a second planet set, the first planet set of the torque vectoring unit being rotatably mounted on a first planet carrier of the torque vectoring unit and meshing radially between a first annulus and a first sun of the torque vectoring unit, the second planet set of the torque vectoring unit being rotatably mounted on a second planet carrier of the torque vectoring unit and meshing radially between a second annulus and a second sun of the torque vectoring unit.

7. The drive device as claimed in claim 6 wherein the first sun of the torque vectoring unit is secured in a stationary manner on a housing, and the second sun of the torque vectoring unit is connected to the electric machine.

8. The drive device as claimed in claim 7 wherein the first annulus and the second annulus are connected to one another for conjoint rotation.

9. The drive device as claimed in claim 1 wherein the first planet set is wider than the second planet set.

10. A method of constructing a drive device for a motor vehicle comprising:
    providing a differential gear including a first planet set, a second planet set, a common planet carrier, a first sun, a second sun and a third sun, the first planet set and the second planet set being rotatably mounted on the common planet carrier, the first planet set meshing at least with the first sun, the second planet set meshing at least with the second sun, the first planet set and the second planet set meshing with one another at least in pairs, the first planet set also meshing with the third sun;
    providing a torque vectoring unit having an electric machine; and
    connecting the differential gear to the torque vectoring unit, at least the second sun being connected to the torque vectoring unit to redistribute torque between the first sun and the second sun, the third sun being connected to the torque vectoring unit to redistribute torque between the first sun and the second sun.

11. A drive device for a motor vehicle comprising:
    a differential gear including a first planet set, a second planet set, a common planet carrier, a first sun, a second sun and a third sun, the first planet set and the second planet set being rotatably mounted on the common planet carrier, the first planet set meshing at least with the first sun, the second planet set meshing at least with the second sun, the first planet set and the second planet set meshing with one another, the first planet set also meshing with the third sun; and
    a torque vectoring unit having an electric machine, at least the second sun being connected to a first portion of the torque vectoring unit, the third sun being connected to a second portion of the torque vectoring unit.

12. The drive device as claimed in claim 11 wherein the first portion of the torque vectoring unit is a first planet carrier.

13. The drive device as claimed in claim 12 wherein the torque vectoring unit includes a first planet set and a first sun, the first planet set of the torque vectoring unit being rotatably mounted on the first planet carrier of the torque vectoring unit, the first sun of the torque vectoring unit being nonrotatably fixed in place.

14. The drive device as claimed in claim 13 wherein the torque vectoring unit includes a first annulus meshing with the first planet set of the torque vectoring unit, the first annulus being radially outside of the first planet set of the torque vectoring unit, the first sun of the torque vectoring unit being radially inside of the first planet set of the torque vectoring unit.

15. The drive device as claimed in claim 13 wherein the second portion of the torque vectoring unit is a second planet carrier, the torque vectoring unit including a second planet set and a second sun, the second planet set of the torque vectoring unit being rotatably mounted on the second planet carrier of the torque vectoring unit, the second sun of the torque vectoring unit being is connected to the electric machine.

16. The drive device as claimed in claim 11 further comprising an electric drive motor, the common planet carrier being connected at least indirectly to the electric drive motor.

17. The drive device as claimed in claim 11 wherein the first sun is connected to a first output shaft, and the second sun is connected to a second output shaft.

18. The drive device as claimed in claim 11 wherein the first planet set is wider than the second planet set.

* * * * *